United States Patent [19]

Warsaw

[11] Patent Number: 4,846,621
[45] Date of Patent: Jul. 11, 1989

[54] GRAIN CART AND AUGER THEREFOR

[76] Inventor: Arthur J. Warsaw, 131 E. Main St., Colfax, Ill. 61728

[21] Appl. No.: 133,122

[22] Filed: Dec. 14, 1987

[51] Int. Cl.[4] .............................................. B65A 33/32
[52] U.S. Cl. .................................... 414/526; 198/313; 198/668; 414/523; 414/505; 414/326
[58] Field of Search ............... 414/326, 526, 523, 505; 198/311, 313, 666, 668, 550.1

[56] References Cited

U.S. PATENT DOCUMENTS

| | | | |
|---|---|---|---|
| 2,772,767 | 12/1956 | Seifert | 414/523 X |
| 2,883,076 | 4/1959 | Palmer | 414/505 X |
| 3,171,558 | 3/1965 | Sharp | 414/505 |
| 3,460,698 | 8/1969 | Harris | 414/526 X |
| 3,719,268 | 3/1973 | Koehnen | 414/523 X |
| 4,037,745 | 7/1977 | Hengen et al. | 198/668 X |
| 4,274,790 | 6/1981 | Barker | 414/505 X |
| 4,411,581 | 10/1983 | Niewold | 414/526 X |
| 4,427,105 | 1/1984 | Hawley et al. | 414/523 X |
| 4,583,905 | 4/1986 | Scheer | 414/523 X |

Primary Examiner—Frank E. Werner
Assistant Examiner—Robert S. Katz
Attorney, Agent, or Firm—Emrich & Dithmar

[57] ABSTRACT

A grain cart includes an auger having a first lower section fixedly mounted to an inner portion of the cart and a second upper section pivotally mounted to an upper end of the first auger section and movable between a retracted, non-use position and an extended, use position. The auger's second section is folded inwardly and maintained in position within an upper portion of the grain cart by gravity when positioned in the retracted position. The second section of the auger is pivotally displaced outwardly to assume the extended, use position wherein the two auger sections are aligned and mechanically coupled for removal of grain from the cart, with the second auger section also maintained in this extended position by gravity. The first and second auger sections are coupled to a mounting plate so as to form an integral structure which is easily removed from and installed in the cart as a unit by means of a plurality of bolts coupling the mounting plate to a lateral wall of the cart. A partition attached to the lower end portion of the auger's second section in combination with slots positioned adjacent to where the first and second auger sections abut eliminates grain loss as the auger is extended to the use position for removal of grain from the cart.

30 Claims, 2 Drawing Sheets

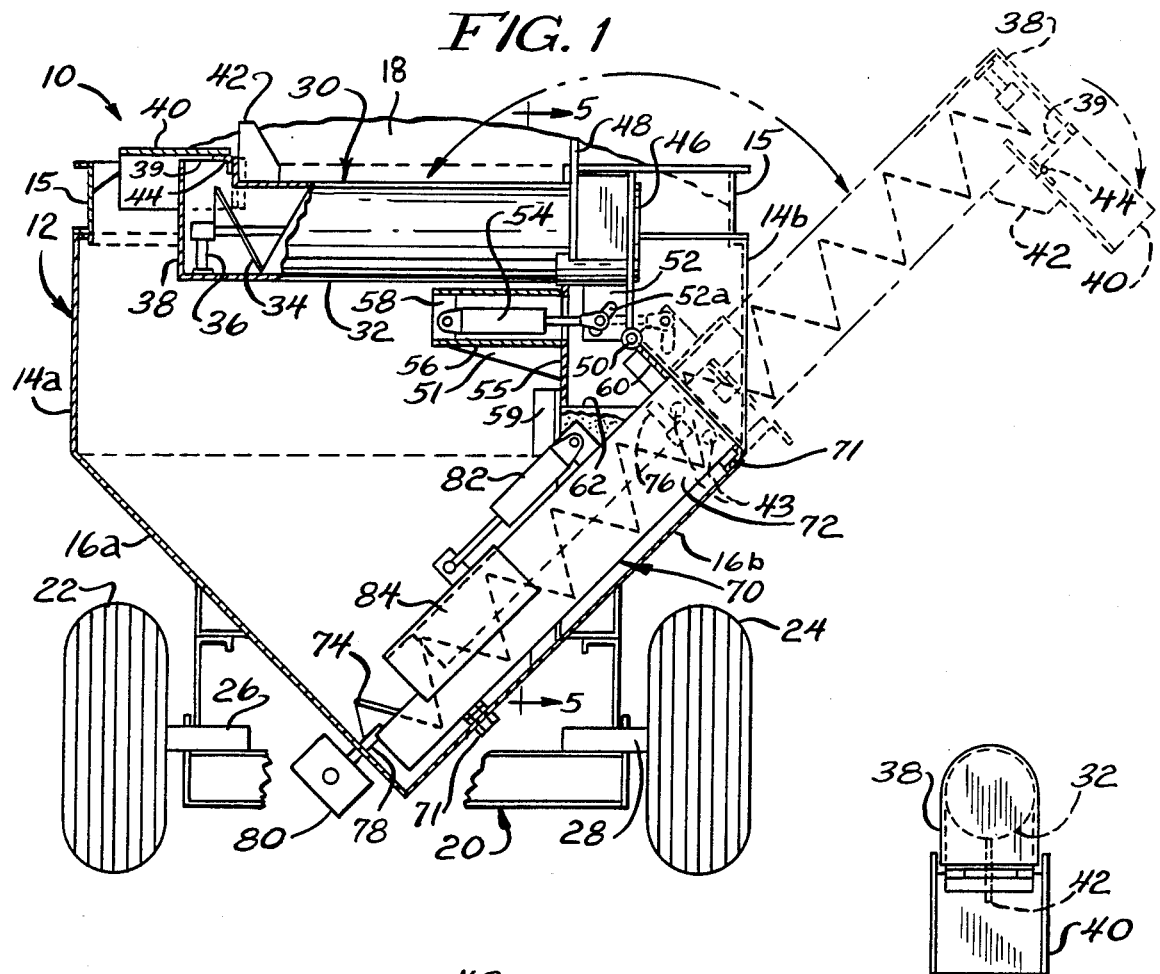
FIG. 1
FIG. 3
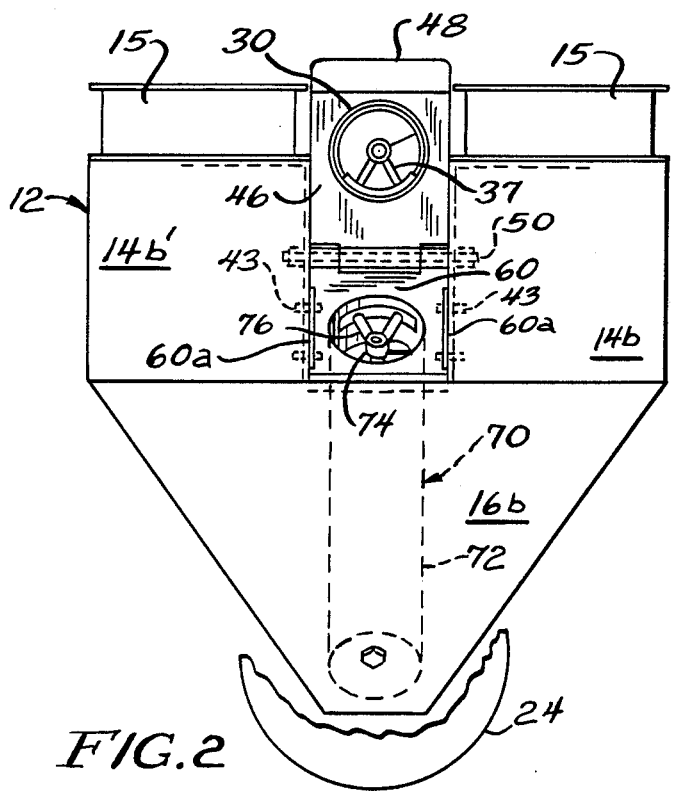
FIG. 2
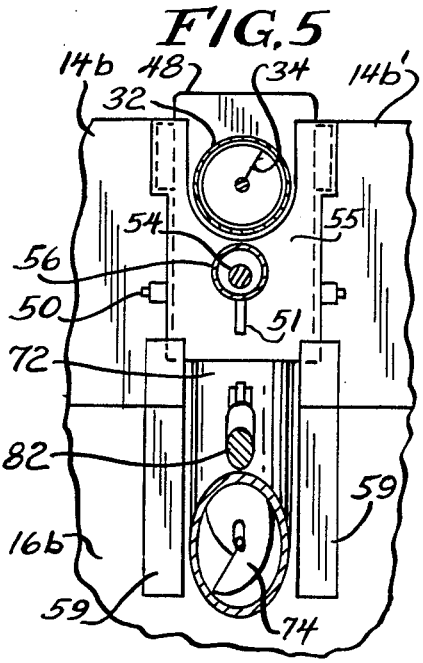
FIG. 5

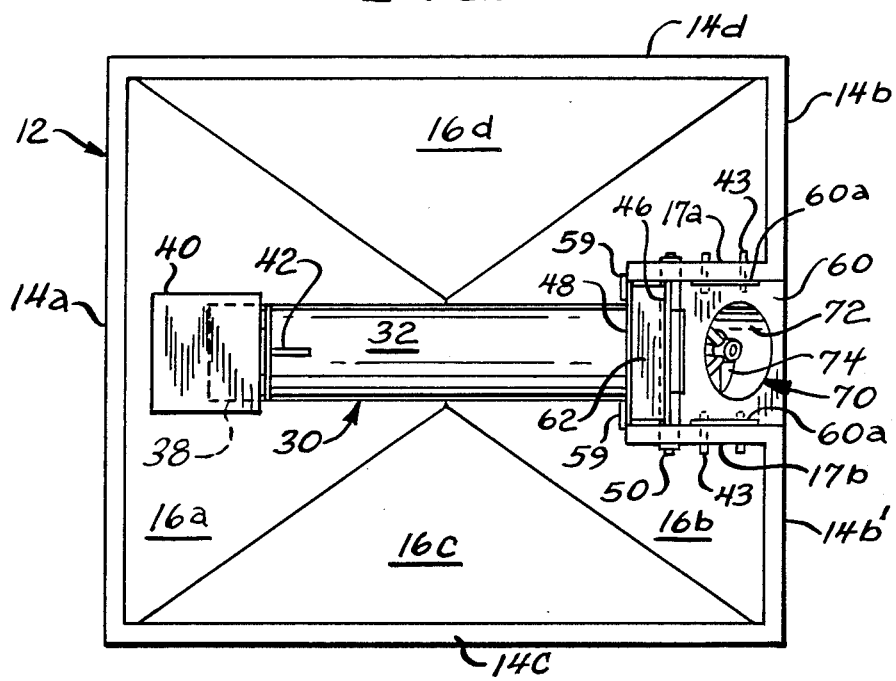
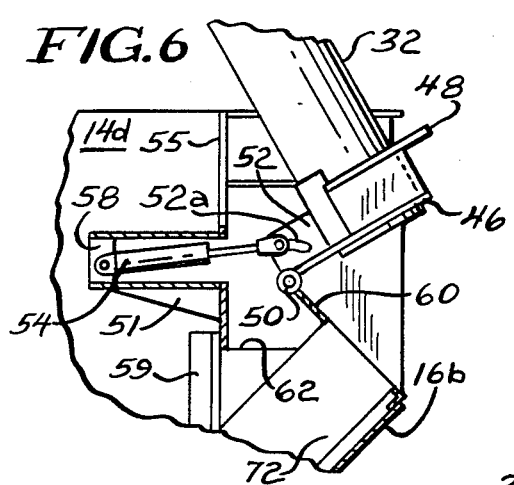
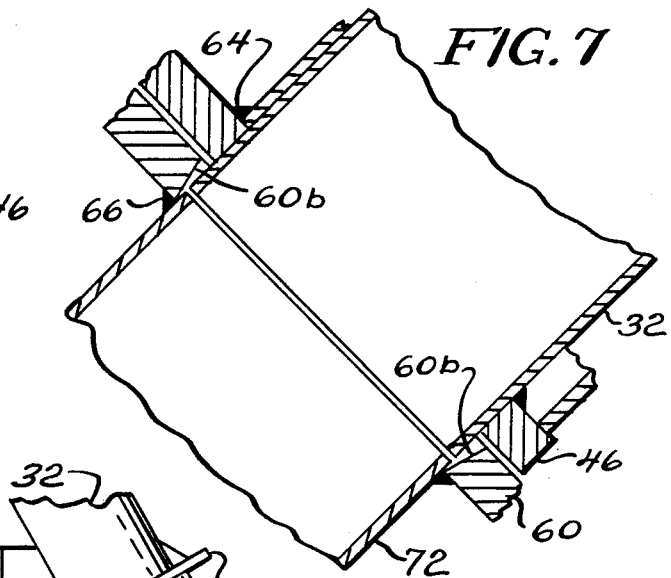
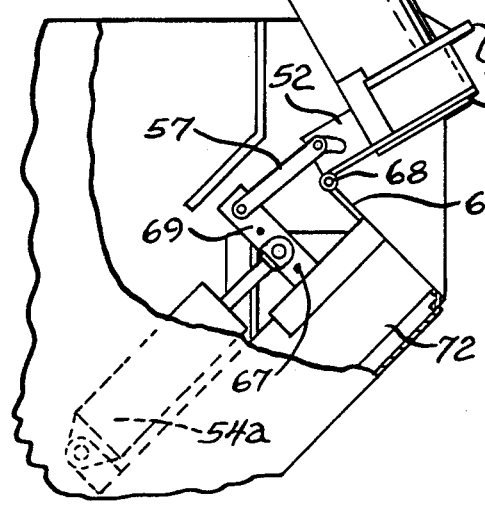

GRAIN CART AND AUGER THEREFOR

BACKGROUND OF THE INVENTION

This invention relates generally to apparatus for transporting grain and is particularly directed to a grain cart having an improved auger arrangement for removing grain from the cart.

A grain cart is typically used in combination with a combine in the harvesting of grain for temporarily storing the harvested grain. In most cases, the grain cart is drawn by a tractor alongside the combine and receives the grain harvested by and discharged from the combine for later deposit in a truck for transport to a grain elevator. The use of the grain cart with the operating combine in an "on-the-go" manner eliminates combine downloading time and thus represents more efficient use of the combine. This is particularly important from an economic standpoint for a combine owner who travels from farm to farm during harvest season and attempts to operate his expensive combine on an almost round the clock basis for extended periods.

It is also important that the grain cart provide as large a grain capacity as possible to minimize interruptions for off loading of the grain onto a truck. However, grain cart size is limited by practical considerations such as the size of the tractor pulling the cart and the condition of the fields in which the cart operates including such factors as wetness, surface irregularities, and slope. The grain cart typically includes a self-contained discharge unit such as a multi-section auger which allows for transfer of grain stored therein to a truck as the cart is being pulled by a tractor. This eliminates harvesting interruptions to transfer the grain from the cart to a truck. A first, lower section of the auger is typically rigidly mounted within a lower portion of the cart, while a second, upper auger section is mounted to an upper, outer wall of the cart and may be pivoted between a first storage position and a second extended, use position wherein the two sections are, in general, linearly aligned. In both orientations, the upper auger section extends outward from a lateral wall of the cart. With most state traffic laws restricting the width of unescorted vehicles to 12 feet or less, extension of the cart's auger beyond one of its lateral walls imposes a restriction on cart width and limits its grain storage capacity. A primary objective in grain cart design is thus to maximize its storage capacity within strict size limits.

Prior art grain carts have also suffered from grain loss due to the manner in which the cart's movable auge assembly is installed in the cart. For example, with the upper, movable auger section mounted to an upper portion of a lateral wall of the cart, movement of the upper auger section from the stored to the extended position frequently results in loss of grain from the cart from an area immediately adjacent to where the upper auger section is mounted to the cart. Prior art grain carts have also not provided for retaining grain in a cart which has been filled to capacity during off loading of the grain from the cart. Prior art attempts to thus confine the grain have typically made use flexible partitions, such as comprised of rubber, positioned adjacent to the proximal end of the upper auger section where it is mounted to the cart. However, these flexible partitions are subject to wear and damage and are thus in need of frequent repair or replacement. In addition, a mechanical or hydraulic locking arrangement is typically required to maintain the movable upper auger section in both the retracted and extended positions in order to prevent extension of the auger when loading the cart and to stabilize the auger during discharge of the grain from the cart. These requirements, of course, increase the cost and complexity of the auger installation and frequently result in grain cart downtime when either locking mechanism is damaged or inoperable.

Finally, in prior art grain carts the two auger sections are installed and operate as two separate components. In addition, each is individually attached to the grain cart's body by welding to provide a high strength installation. Thus, repair or replacement of one of the auger sections requires the use of a cutting torch to remove the damaged auger section. This operation is complicated, tedious, and expensive and frequently results in warpage of the cart's flat steel panels, which may also occur during the welding installation of the auger. In either case, the assembly and repair of the grain cart are made more complex and difficult by this type of auger installation.

The present invention is intended to overcome the aforementioned limitations of the prior art by providing a two section auger for use in a grain cart which substantially eliminates grain losses from the cart and does not reduce the cart's grain storage capacity. In addition, the grain cart of the present invention incorporates an integral auger assembly which may be easily installed in and removed from the cart as a single unit.

OBJECTS AND SUMMARY OF THE INVENTION

Accordingly, it is an object of the present invention to provide an improved cart for holding and transporting grain.

It is another object of the present invention to provide an integral auger assembly for use in a grain cart which is easily mounted in and removed from the cart's body.

Yet another object of the present invention is to provide a grain cart with an auger installation which does not increase the outer dimensions of the cart when in the retracted, non-use position.

A further object of the present invention is to minimize the loss of grain stored in a mobile cart during transport or when removed, or discharged, from the cart.

A still further object of the present invention is to provide an auger installation for a grain cart wherein the auger is maintained in a stable manner in either the retracted, non-use position or the extended, use position without employing mechanical, hydraulic or pneumatic locking means.

Another object of the present invention is to facilitate and reduce the cost of the manufacture, assembly and repair of a grain cart.

This invention contemplates a grain cart having an auger for the removal of grain therefrom, the auger having a lower section fixedly mounted to a lateral wall of and positioned within the cart and an upper section pivotally mounted to the auger's lower section adjacent to the upper end thereof. Under the control of a hydraulic cylinder, the auger's upper section may be pivotally displaced between an extended, use position wherein it extends out of the cart and is aligned with the lower section for removal of grain from the cart and a retracted, non-use position wherein it is positioned entirely within the cart. Various partitions, as well as an aperture in one embodiment, are provided adjacent to the pivot axis of the upper auger section to prevent spillage or loss of grain when the upper section is displaced to the extended position as well as during grain removal. The upper auger section is maintained in the extended and retracted positions by gravity and its open end is provided with a movable cover/chute to prevent entry of grain when the upper section is retracted and to guide the unloaded grain when extended. The upper and lower auger sections form a unitary structure which is easily mounted to and removed from a lateral wall of the cart body. In one embodiment, adjacent abutting edge portions of the upper and lower auger sections are configured to receive each other in interfitting engagement for eliminating grain loss as the grain is discharged by the auger.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a vertical sectional view taken transverse to its direction of travel of a grain cart embodying the principles of the present invention;

FIG. 2 is a side view of the grain cart of FIG. 1;

FIG. 3 illustrates details of the distal end portion of the pivoting upper section of the auger incorporated in the grain cart of the present invention;

FIG. 4 is a top plan view of the grain cart of FIG. 1 illustrating the auger in the retracted, non-use position;

FIG. 5 is a sectional view of the grain cart of FIG. 1 taken along right line 5—5 therein;

FIG. 6 is a sectional view illustrating details of the manner in which the upper and lower auger sections are coupled together and mounted in the grain cart of the present invention;

FIG. 7 is a sectional view illustrating details of the coupling between adjacent end portions of the auger's upper and lower sections in accordance with one embodiment of the present invention; and FIG. 8 is a sectional view illustrating details of another arrangement for coupling the upper and lower auger sections together in the grain cart of the present invention.

DETAILED DESCRIPTION OF THE PREFERRED EMBODIMENT

Referring to the various figures, there are shown various views and details of a grain cart 10 in accordance with the principles of the present invention.

The grain cart 10 includes a housing or body 12 comprised of a plurality of lateral walls 14a, 14b, 14b', 14c and 14d coupled in an end-to-end configuration at right angles so as to form a generally rectangular structure open at the top. Coupled to respective lower edge portions of the various lateral walls of the grain cart's body 12 are a plurality of inclined lower walls 16a, 16b, 16c and 16d which meet at the respective lower ends thereof and form a generally V-shaped structure closed at the bottom. Mounted to the respective outer surfaces of the lower walls 16a, 16b, 16c and 16d such as by weldments is an undercarriage structure 20. Mounted to respective lateral portions of the undercarriage structure 20 are axles 26 and 27, to which are rotationally mounted respective wheels 22 and 24. Not shown for simplicity is a structure, such as a 3-point hitch or other conventional coupling arrangement, for coupling the grain cart 10 to a tractor (also not shown) by means of which a grain cart may be pulled alongside a combine during harvesting of the grain.

The combination of the lateral walls 14a through 14d and the lower walls 16a through 16d form a generally rectangular structure which is open at the top and has a generally V-shaped lower portion. The grain cart 10 is adapted to store and transport grain, shown as element 18 in FIG. 1, which is deposited therein during harvesting of the grain and removed therefrom and deposited in another vehicle such as a truck for transport to a grain elevator for storage therein. Extensions 15 may be attached to upper edge portions of each of the lateral walls 14a through 14d to increase the grain carrying capacity of the grain cart 10. Generally vertically oriented recessed walls 17a and 17b extend inwardly from respective lateral walls 14b and 14b' to provide a lateral recessed, upper portion in the grain cart's body 12 to accommodate upper and lower auger sections 30, 70 mounted therein.

The upper outlet auger section 30 includes an elongated, cylindrical linear tube 32 having positioned therein and along the length thereof an auger 34. The auger 34 is maintained in position within the elongated linear tube 32, and is free to rotate along its length therein, by means of a pair of shaft support bearings 36 and 37.

Mounted to one end of the elongated linear tube 32 is a first mounting plate 46. The first mounting plate 46 is pivotally mounted to a second mounting plate 60 which is securely mounted to the cart's body 12 as described below. The opposite end of the elongated linear tube 32 is provided with a fixed end plate 38 which covers the end of the elongated linear tube. Pivotally mounted to the end plate 38 by means of a pivot pin 44 is a cover 40. The cover 40 is thus free to pivot with respect to the linear tube 32 as well as with respect to the end plate 38 mounted to the distal end thereof. The cover 40 is generally U-shaped and is attached to the end plate 38 so as to cover an aperture 39 therein when the tube 32 of the upper auger section 30 is in the retracted position, as shown by the solid lines in FIG. 1. With the upper auger section 30 pivotally displaced to the extended, or use, position, as shown in dotted line form in FIG. 1, the cover 40 is free to pivot downwardly so as to assume an extended orientation whereupon the cover 40 is aligned with the aperture 39 in the end plate 38. Thus, in the retracted or nonuse position, the pivoting cover 40 covers the aperture in the distal end of the upper outlet auger section 30 to prevent grain 18 from entering its elongated linear tube 32, while in the extended or use position the pivoting cover 40 is aligned with the aperture 39 in the distal end of the upper auger section to permit grain to be discharged out of the aperture therein. The U-shaped configuration of the pivoting cover 40 confines and directs the grain discharged from the upper auger section 30 in a controlled manner so that it is deposited where intended. A pivot stop 42 is mounted to an outer portion of the elongated linear tube 32 adjacent to the distal end thereof to limit downward rotational displacement of the pivoting cover 40 when the upper auger section 30 is positioned in the extended configuration.

Mounted to the inner end portions of recessed walls 17a and 17b is a flat, generally vertically oriented plate 55 having an aperture therein. Coupled to a lower portion of the plate 55 and providing support therefor are a pair of elongated, generally flat reinforcing members 59. Coupled to the plate 55 and positioned over the aperture therein is a cylindrical housing 56 which includes a mounting plate 58 and is supported by a brace 51 also attached to the plate 55. Positioned within the cylindrical housing 56, with its butt end securely coupled to the mounting plate 58, is a hydraulic cylinder 54. In a preferred embodiment, the hydraulic cylinder 54 is of the double-acting type and is coupled to and actuated by the hydraulic system of a tractor (not shown) to which the grain cart 10 is coupled and by means of which it is transported. The rod end of the hydraulic cylinder 54, which includes the combination of a coupling pin and clevis, is positioned within a slot 52a in a coupling plate 52 which, in turn, is securely coupled to the first mounting plate 46. Thus, in response to actuation by the tractor's hydraulic system, the hydraulic cylinder 54 may be extended from its configuration shown in solid line form in FIG. 1, wherein the upper auger section 30 is in the retracted position, to that shown in dotted line form wherein the upper auger section is in the extended configuration for removal of grain from the grain cart 10. Upon extension of the hydraulic cylinder 54, the upper outlet auger section 30 is rotationally displaced in a clockwise direction with reference to the various figures in a pivoting manner about the pivot pin 50. During extension of the hydraulic cylinder 54, the hydraulic cylinder itself pivots about its coupling to the mounting plate 58 as shown in FIG. 6 wherein the elongated linear tube 32 of the upper auger section is shown in a position intermediate between the fully retracted and fully extended configurations. The slot 52a within the coupling plate 52 may be either linear or it may also be slightly curved as shown in FIG. 6 in order to facilitate pivoting displacement of the combination of the coupling plate 52 and elongated linear tube 32 about the pivot pin 50.

Mounted to the elongated linear tube 32 of the upper auger section 30 adjacent to the end attached to the first mounting plate 46 is a confinement panel 48. The confinement panel 48 extends upward above the elongated linear tube 32 when the upper auger section 30 is in the retracted position to prevent grain from overflowing the grain cart and being deposited on the ground. As shown in FIG. 1, the confinement panel 48 extends to a higher elevation than the lateral wall extensions 15 because of its position closer to the center of the grain cart 10. The height of the confinement panel 48 may assume a wide range of values depending upon what grain capacity it is desired to provide the grain cart with. An overflow aperture 62 is provided for between the lower end of the plate 55 and an adjacent lateral wall of the grain cart's body 12. The overflow aperture 62 allows grain which escapes from the grain cart over the upper edges of the recessed walls 17a and 17b or confinement panel 48 to flow downward between the confinement panel 48 and plate 55 and back into the grain cart. Grain may be displaced over the upper edges of the recessed walls 17a and 17b or confinement panel 48 when the upper outlet auger section 30 is moved to the operating position as shown in dotted line form in FIG. 1. This prevents loss of grain from the cart in the event the cart is filled to a level which exceeds the heights of those walls defining the recessed portion in which the upper auger section 30 is mounted.

The lower inlet auger section 70 is fixedly coupled to the lower wall 16b of the grain cart's body 12 by means of a plurality of mounting brackets and coupling pins 71. As in the case of the upper auger section 70, the lower auger section 70 also includes an elongated linear tube 72 within which is positioned along the length thereof an auger 74. The lower end of the auger 74 is attached to a coupling/mounting shaft 78, while the upper end of the auger is maintained in position by a shaft support bearing 76. The coupling/mounting shaft 78 is inserted through an aperture in the lower wall 16a and is free to rotate therein. Thus, the auger 74 is rotatably positioned within the elongated linear tube 72. Positioned on the lower distal end of the coupling/mounting shaft 78 is an auger drive unit 80 which typically is a gear box coupled by means of appropriate linkage and an elongated shaft to the power take-off unit of the tractor pulling the grain cart, which is not shown in the figures for simplicity. It is in this manner that the auger 74 is rotationally displaced within the elongated linear tube 72 of the lower inlet auger section 70. With the upper auger section 30 in the extended position, as shown in dotted line form in FIG. 1, a series of pins (not shown) linking auger 34 to auger 74 provides for corresponding rotational displacement of auger 34 when auger 74 is rotated. The two augers 34 and 74 may be coupled by any well known conventional arrangement such as the aforementioned pins. Since the manner in which the two augers 34 and 74 are coupled does not form a part of the present invention, details of the coupling between these two auger sections are not described herein.

The butt end of another hydraulic cylinder 82 is securely mounted to a lateral, outer portion of the elongated linear tube 72 of the lower auger section 70. The rod end of the hydraulic cylinder 82 is coupled to an access door 84 which is displaceably mounted upon the outer surface of the elongated linear tube 72. The mounting of the access door 84 on the elongated linear tube 72 is such as to allow the access door to be slidably displaced along the length of the linear tube by the extension and retraction of the hydraulic cylinder 82. The hydraulic cylinder 82 is coupled by means of appropriate lines and couplers to a suitable hydraulic fluid pressure source, which is not shown in the figures for simplicity, such as found in most tractors. The lower end of the linear tube 72 is provided with a cut-out portion over which the access gate 84 may be positioned when in the fully lowered configuration. In normal operation, the access gate 84 is initially raised by the hydraulic cylinder 82 to its uppermost position along the length of the linear tube prior to deposit of grain in the grain cart 10. After the grain cart 10 is loaded and as the grain is discharged from the grain cart by the augers 34 an 74 and its level is lowered, the access gate 84 is displaced downward by extension of the hydraulic cylinder 84 toward the lower end of the linear tube 72 to ensure that the cut-out portion on the lower end of the linear tube 72 is completely covered by the access gate and grain remaining in the cart. Operating the lower auger section 70 with the lower cut-out portion of its linear tube 72 not completely covered with grain such as where the access gate 84 is positioned in the full up position along the length of the linear tube, will prevent all of the grain from being removed from the cart and allow a portion of the grain displaced upward by the auger 74 to fall back down into the cart and not be discharged therefrom.

In one embodiment, the second mounting plate 60 is provided with a pair of facing flanges 60a positioned on respective lateral edges thereof. The flanges 60a may be either welded to or formed of the same piece as the main portion of the second mounting plate 60 to which the lower auger section 70 is attached. The second mounting plate 60 as well as the lower auger section 70 attached thereto may be mounted within the grain cart's body 12 by means of a plurality of coupling pins or mounting bolts 43 inserted through respective pairs of aligned apertures within the mounting plate's flanges 60a and the recessed walls 17a and 17b. With the upper auger section 30 pivotally coupled to the second mounting plate 60 by means of the first mounting plate 46, the combination of the upper and lower auger sections may thus be mounted in and removed from the grain cart body 12 by means of the plurality of coupling pins 43 or nut and bolt combinations. This mounting arrangement greatly facilitates installation and removal of the upper and lower auger sections 30, 70 from the grain cart body 12 and allows the entire auger assembly to be installed in the grain cart body after manufacture of the body such as at a remote location. In addition, should either the upper or lower auger sections 30, 70 become damaged or need repair, the mounting arrangement described herein greatly facilitates the removal of the entire auger assembly for repair or replacement.

Referring to FIG. 7, there is shown a preferred arrangement for the interfacing between the respective elongated linear tubes 32 and 72 of the upper and lower auger sections. In the embodiment of FIG. 7, the elongated linear tube 72 of the lower auger section is inserted in an aperture in the second mounting plate 60 and is securely coupled thereto by means of a weldment 66. Similarly, the elongated linear tube 32 of the upper auger section is positioned within an aperture in the first mounting plate 46 and is securely coupled thereto by means of another weldment 64. The inner edge 60b of the second mounting plate 60 defining the aperture therein may be angled outward from the center of the aperture as shown in FIG. 7, although the present invention is not limited to this configuration, to facilitate insertion of the proximal end portion of the elongated linear tube 32 within the second mounting plate's aperture. The angled, or beveled, inner edge 60b defining the aperture in the second mounting plate 60 also ensures more intimate and secure contact between the adjacent, facing edges of the elongated linear tubes 32 and 72. This approach avoids the problems of warpage of the metal mounting plates 46 and 60 generally encountered during welding. The improved engagement between the upper and lower auger sections and the close proximity of the adjacent, facing edges of the respective elongated linear tubes in these auger sections affords more reliable transfer of grain from the lower auger section to the upper auger section and substantially reduces the possibility of leakage, or loss, of grain from the auger assembly during discharge of the grain from the grain cart. Reduction in grain loss provides an obvious economic benefit to the farmer.

Referring to FIG. 8, there is shown a sectional view illustrating details of another arrangement for pivotally coupling the upper and lower auger sections together in the grain cart of the present invention. In the arrangement of FIG. 8, the coupling plate 52 attached to the proximal end of the upper elongated linear tube 32 is pivotally coupled to the mounting plate 60 by means of a pivot pin 68. This allows the upper auger section to be pivotally displaced relative to the fixed lower auger section. A double acting hydraulic cylinder 54a is mounted to the elongated linear tube 72 of the lower auger section. The rod end of the hydraulic cylinder 54a is coupled to a pivot arm 69 which, in turn, is pivotally coupled to the linear tube 72 by means of the combination of a mounting bracket and pivot pin 67. Extension and retraction of the hydraulic cylinder 54a pivotally displaces the pivot arm 69 about the pivot pin 67. The distal end of the pivot arm 69 is coupled to the coupling plate 52 by means of a coupling arm 57. This arrangement permits extension and retraction of the hydraulic cylinder 54a for pivotally displacing the elongated linear tube 32 of the upper auger section about the pivot pin 68. Mounting of the hydraulic cylinder 54a on the lower auger section affords an integrated auger construction permitting the entire auger as well as its control hydraulics to be removed from the grain cart, when necessary. This auger construction facilitates integration of the hydraulic cylinder 54a in the auger and allows this integration to be accomplished with the auger removed from the grain cart such as during fabrication or following removal of and repair to the auger. This arrangement also facilitates installation and removal of the auger assembly from the grain cart. This integrated structure substantially reduces problems arising from misalignment between the hydraulic cylinder and moving parts of the auger assembly.

There has thus been shown a grain cart having a two-piece auger assembly comprised of a lower auger section fixedly mounted within the grain cart and an upper auger section pivotally mounted to an upper end of the lower auger section and movable between a retracted position entirely within the grain cart and in extended position for removal of the grain from the cart. The auger assembly thus does not increase the outer dimensions of the cart when in the retracted, non-use position. The upper and lower auger sections are attached by means of a single mounting plate to the grain cart body to facilitate installation in and removal of the auger assembly from the grain cart. The auger assembly is not subject to damage when the grain cart is backed up or passes through a doorway or is moved close to other obstacles since it is positioned entirely within the cart when retracted in the non-use position.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A cart for storing and transporting grain, said cart comprising: a body open at the top and having a plurality of lateral walls and a closed bottom and adapted to receive and hold grain; a plurality of wheels coupled to said body to facilitate transport of said body; a first lower auger section positioned within and mounted to a lateral wall of said body and adapted to displace grain positioned therein upward toward an open upper end thereof; a second upper auger section coupled to said first lower auger section adjacent to the open upper end thereof and movable between a first retracted position wherein said second auger section is positioned within said body and a second extended position wherein said second auger section is aligned in end-to-end contact with the open upper end of said first auger section and extends beyond said body; displacement means coupled to said second auger section for moving said second auger section between said first retracted and said second extended positions; and confinement means for preventing loss of grain from said cart body when said second auger section is in the first retracted position or is displaced between said first retracted and second extended positions, wherein said confinement means includes a partition positioned adjacent to an end of said second auger section which is in end-to-end contact with the open upper end of said first auger section when in the second extended position.

2. The cart of claim 1 wherein each lateral wall of said cart body includes a generally vertical upper portion and an inclined lower portion coupled thereto and wherein said first lower auger section is mounted to an inclined lower portion of one of said lateral walls.

3. The cart of claim 1 further comprising mounting means for securely coupling said first auger section to an inner portion of a lateral wall of said cart body.

4. The cart of claim 3 wherein said mounting means is removably coupled to the inner portion of a lateral wall to facilitate installation in and removal of said first and second auger sections from said cart body.

5. The cart of claim 4 wherein said mounting means includes a first mounting plate coupled to an upper end portion of said first lower auger section and to a lateral wall.

6. The cart of claim 5 wherein said second auger section includes a second mounting plate positioned on said second auger section adjacent to the end thereof which is in contact with the open upper end of said first auger section and is pivotally coupled to said first mounting plate.

7. The cart of claim 6 wherein said first and second mounting plates are coupled by means of a pivot pin.

8. The cart of claim 1 wherein said second upper auger section includes first and second open end portions, with said first open end portion positioned in end-to-end contact with the open upper end of said first auger section and said second open end portion of said second auger section extending beyond said cart body when in the second extended position.

9. The cart of claim 8 further including structural means for covering the second open end portion of said second auger section when in the retracted position and for directing grain discharged from the second open end portion of said second auger section when in the extended position.

10. The cart of claim 9 wherein said structural means includes a plate member pivotally coupled to said second auger section adjacent to the second open end portion thereof.

11. The cart of claim 1 wherein said confinement means further includes an aperture in a lateral wall of said cart body adjacent to the contacting ends of said first and second auger sections when in the second extended position to permit grain displaced from said cart body when the second auger section is displaced between the retracted and extended positions to flow back into the cart body.

12. The cart of claim 1 wherein said second upper auger section is stably maintained in the first retracted and second extended positions by gravity.

13. The cart of claim 1 wherein said displacement means includes a hydraulic cylinder.

14. The cart of claim 13 wherein said hydraulic cylinder is coupled to said cart body and to said second auger section adjacent to an end thereof which is in end-to-end contact with said first auger section when in the extended position.

15. A cart for storing and transporting grain, said cart comprising: a body open at the top and having a plurality of lateral walls and a closed bottom and adapted to receive and hold grain, wherein one of the lateral walls of said body includes a slot in an upper portion thereof; a plurality of wheels coupled to said body to facilitate transport of said body; a first lower auger section positioned within and mounted to a lateral wall of said body and adapted to displace grain positioned therein upward toward an open upper end thereof; a second upper auger section coupled to said first lower auger section adjacent to the open upper end thereof and movable between a first retracted position wherein said second auger section is positioned within said body and a second extended position wherein said second auger section is positioned within the slot in said one of the lateral walls and in alignment and end-to-end contact with the open upper end of said first auger section and extends beyond said body; displacement means coupled to said second auger section for moving said second auger section between said first retracted and said second extended positions; and confinement means disposed adjacent to said slot for preventing loss of grain from said cart body when said second auger section is in the first retracted position or is displaced between said first retracted and second extended positions.

16. A coupling arrangement for first and second auger sections aligned so as to form a single continuous auger for carrying grain, said coupling arrangement comprising: a first elongated linear cylindrical tube in the first auger section; a second elongated linear cylindrical tube in the second auger section; a first generally flat plate mounted to an open end of said first elongated tube, said first plate having a first generally circular aperture therein within which is positioned and through which is inserted the open end of said first elongated tube; and a second generally flat plate mounted to an open end of said second elongated tube, said second plate having a generally circular second aperture therein within which is positioned the open end of said second elongated tube, said second aperture defined by a beveled inner surface of said second plate and characterized as having a larger diameter on a first surface of said second plate facing said first plate than on a second opposed surface facing said second tube.

17. An auger for use in a grain cart for removing grain from said cart, said auger comprising: a first lower auger section mounted to an inner wall of said cart and having open upper and lower end portions; a second upper auger section having first and second open end portions; displaceable coupling means for mounting said first and second auger sections to said cart and for pivotally coupling said first and second auger sections such that said second auger section is displaceable between a retracted position within the cart and an extended position wherein said second auger section is aligned with said first auger section with the first open end portion of said second auger section positioned in contact with the upper end portion of said first auger section and the second open end portion of said auger section extending outside of the cart; and confinement means for preventing loss of grain from said cart when said second auger section is in the retracted position or is displaced between the retracted and extended positions, said confinement means including a partition positioned adjacent to an end of said second auger section which is in end-to-end contact with the open upper end of said first auger section when in the extended position.

18. The auger of claim 17 wherein said coupling means includes a plurality of removable coupling pins affixed to said cart to facilitate installation in and removal from said cart of said first and second auger sections as a unit.

19. The auger of claim 18 wherein said coupling means further includes first and second pivotally coupled mounting plates respectively mounted to said first and second auger sections.

20. The auger of claim 19 wherein said first and mounting plates is removably coupled to said cart by means of said plurality of coupling pins.

21. The auger of claim 20 wherein said cart includes a plurality of lateral walls with said first mounting plate removably coupled to one of said lateral wall.

22. The auger of claim 19 wherein said first and second mounting plates are coupled together by means of a pivot pin.

23. The auger of claim 17 further including structural means for covering the second open end portion of said second auger section when in the retracted position and for directing grain discharged from the second open end portion of said second auger section when in the extended position.

24. The auger of claim 9 wherein said structural means includes a plate member pivotally coupled to said second auger section adjacent to the second open end portion thereof.

25. The auger of claim 17 wherein said confinement means further includes an aperture in a lateral wall of said cart body adjacent to the contacting ends of said first and second auger sections when in the extended position to permit grain displaced from said cart when the second auger section is displaced between the retracted and extended positions to flow back into the cart.

26. The auger of claim 17 wherein said second upper auger section is stably maintained in the retracted and extended positions by gravity.

27. The auger of claim 17 further comprising displacement means coupled to said second upper auger section for displacing said second upper auger section between the retracted and extended positions.

28. The auger of 27 wherein said displacement means includes a hydraulic cylinder.

29. The cart of claim 28 wherein said hydraulic cylinder is coupled to said cart and to said second auger section adjacent to the first open end portion thereof.

30. An auger for use in a grain cart having a plurality of lateral walls for removing grain from said cart, said auger comprising: a first lower auger section mounted to an inner wall of said cart and having open upper and lower end portions; a second upper auger section having first and second open end portions; displaceable coupling means for mounting said first and second auger sections to said cart and for pivotally coupling said first and second auger sections such that said second auger section is displaceable between a retracted position within the cart and an extended position wherein said second auger section is positioned within a slot in an upper portion of a lateral wall of the cart and in alignment with said first auger section with the first open end portion of said second auger section positioned in contact with the upper end portion of said first auger section and the second open end portion of said second auger section extending outside of the cart; and confinement means disposed adjacent to said slot for preventing loss of grain from said cart when said second auger section is in the retracted position or is displaced between the retracted and extended positions.

* * * * *